April 29, 1924.

D. J. CAMPBELL 1,492,355

AIR OPERATED MOLDING APPARATUS

Filed Nov. 13, 1922    6 Sheets-Sheet 2

Inventor
Donald J. Campbell
By Frank E. Liverance, Jr.
Attorney.

April 29, 1924.

D. J. CAMPBELL

AIR OPERATED MOLDING APPARATUS

Filed Nov. 13, 1922  6 Sheets-Sheet 4

1,492,355

Inventor
Donald J. Campbell
By Frank E. Liverance, Jr.
Attorney.

April 29, 1924.

D. J. CAMPBELL 1,492,355

AIR OPERATED MOLDING APPARATUS

Filed Nov. 13, 1922 6 Sheets-Sheet 5

Inventor
Donald J. Campbell
By Frank E. Liverance, Jr.
Attorney.

April 29, 1924.

D. J. CAMPBELL

AIR OPERATED MOLDING APPARATUS

Filed Nov. 13, 1922

Inventor
Donald J. Campbell
By Frank E. Liverance, Jr.
Attorney

Patented Apr. 29, 1924.

1,492,355

UNITED STATES PATENT OFFICE.

DONALD J. CAMPBELL, OF MUSKEGON HEIGHTS, MICHIGAN.

AIR-OPERATED MOLDING APPARATUS.

Application filed November 13, 1922. Serial No. 600,685.

*To all whom it may concern:*

Be it known that I, DONALD J. CAMPBELL, a citizen of the United States of America, residing at Muskegon Heights, in the county of Muskegon and State of Michigan, have invented certain new and useful Improvements in Air-Operated Molding Apparatus; and I do hereby declare the following to be a full, clear, and exact description of the invention, such as will enable others skilled in the art to which it appertains to make and use the same.

This invention relates to molding apparatus wherein compressed air is utilized for the ramming of sand into the flask around the pattern, and is further utilized as a means for operating the mechnical features of the construction, such as moving the sand holding receptacle from which the sand is projected upwardly against the flask and the flask upwardly against a relatively stationary supporting part of the apparatus to clamp them together when the air is used to force the sand into the flask, and further to release the valve mechanism momentarily which is interposed between the air reservoir and the sand receptacle to permit the air to act and project the sand into the flask. In the present invention, the projection of the sand is upwardly into the flask, with a location of the air reservoir at the lower part of the apparatus, this resulting in a marked simplification of the apparatus as compared with other apparatus where the sand is projected downwardly into a flask by pneumatic means, the only rotating parts being necessary being those which carry the flasks and which are rotatably mounted to carry the flasks from filling to removing positions and vice versa. Many other objects and purposes, together with various novel constructions and arrangements of parts for attaining the same will appear as understanding of the invention is had from the following description, taken in connection with the accompanying drawings, in which, Fig. 1 is a front elevation of the molding apparatus of my invention.

Like reference characters refer to like parts in the several figures of the drawings.

Figure 1:
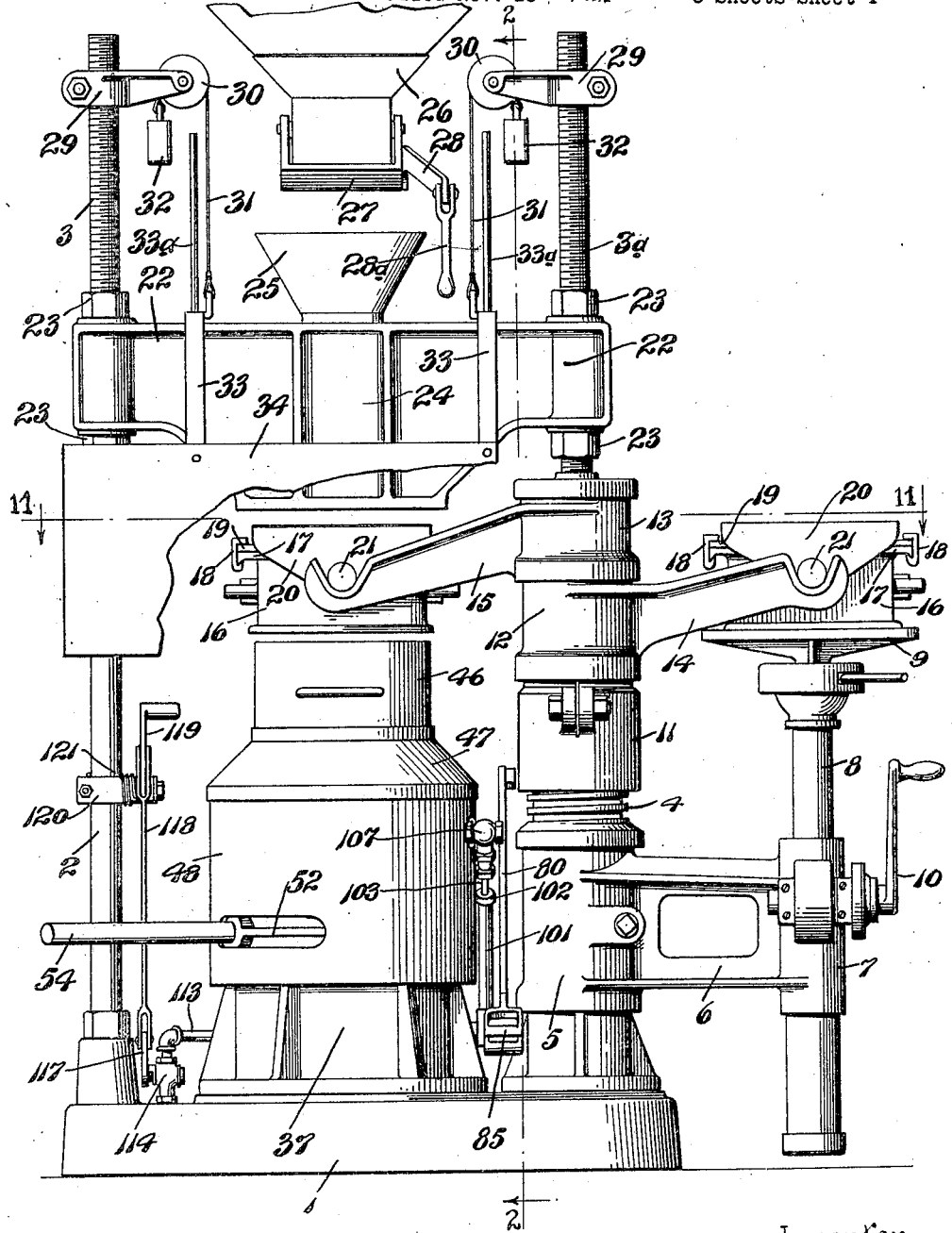

In the construction of the apparatus, a heavy base 1, of cast iron is used, from which at one side a post 2 extends vertically, being threaded at its upper portion, as indicated at 3. At the opposite side of the base, a second post is positioned and extends vertically, a portion 4 thereof being threaded, as shown, below which a sleeve 5 is rotatably mounted, and is provided with means for securing it to the post against rotation when adjusted to a desired position. An arm 6 extends from the post, terminating in a sleeve 7 at its outer end in which a post 8 is mounted for vertical adjustment, a leveling table 9 being mounted at the upper end of the post. Post 8 may be vertically moved through suitable mechanism actuated by the crank 10. As this mechanism forms no part of the present invention it is not further outlined, the whole being designed as a receiving table for flasks with moulds therein formed with the molding apparatus of this invention.

An adjusting sleeve nut 11 is mounted on the threaded portion 4 of the post, on which a collar 12 is rotatably mounted, a second collar 13 lying above the first collar and also rotatably mounted for turning movements about the post. Yokes 14 and 15 extend from the collars for carrying the flasks 16 in which the moulds are made. Each flask has oppositely extending flanges 17 adapted to be detachably coupled to a bed 19 by clamps 18, said bed being secured to a bottom 19$^a$ from which two sides 20 extend at right angles, lying between the arms of the yokes 14 and 15, and having laterally extending journal pins 21 to enter suitable bearing sockets formed in the upper sides of the end portions of the arms. The bed 19 is designed to carry any desired form of pattern 22 which extends into the flask when it is attached. It is evident that different bed or pattern plates 19 with different patterns attached thereto may be releasably connected with the bottom 19$^a$ of the flask carrying member, so that different classes of work may be done in the same molding machine.

Figure 2:
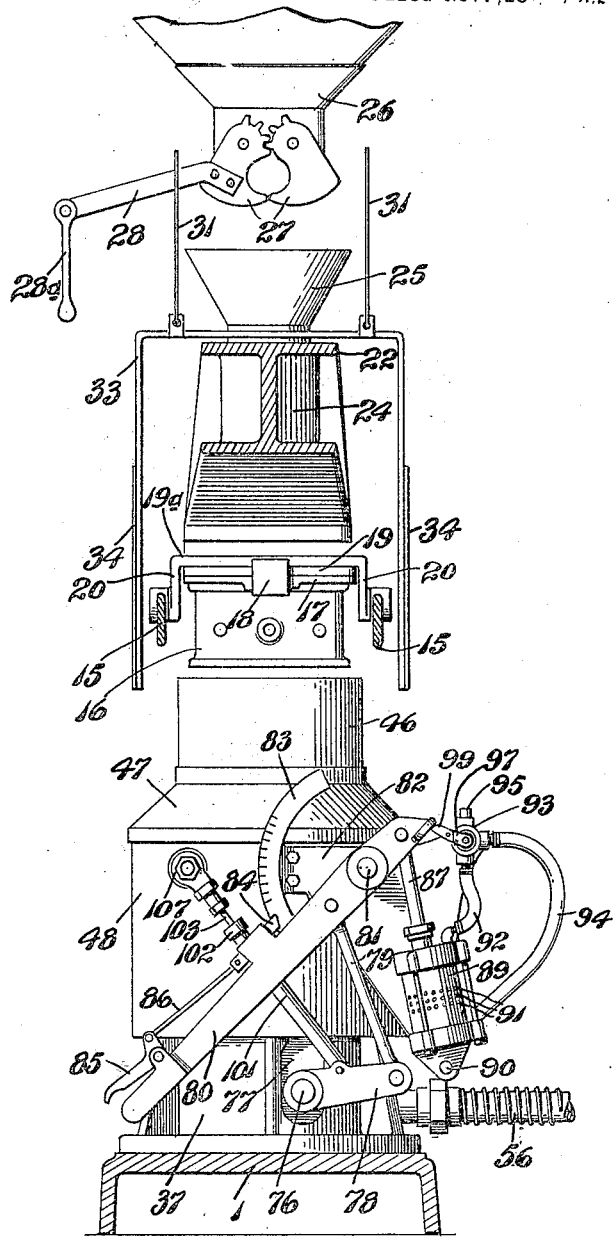
Fig. 2 is a vertical section and side elevation, the section being taken on line 2—2, of Fig. 1.

The post on which collars 12 and 13 are mounted is reduced in size above the threaded portion 4, as indicated at 2$^a$ and above the collar 13 is threaded, as at 3$^a$ similar to the threaded portion 3 of the other post 2. A cross beam 22 lies between the posts at the threaded parts thereof, the posts passing through the ends of the beam, nuts 23 being placed on parts 3 and 3$^a$ above and below the ends of the beam for securing it in position. The middle portion of the beam is enlarged and has a vertical passage therethrough, indicated at 24, in the upper end of which a funnel 25 is located, lying directly below the lower end of a hopper 26 into which sand is carried. The lower end of the hopper is normally closed by movable doors 27, pivotally mounted and geared together, as shown in Fig. 2, being simultaneously moved to open position through a lever 28 and handle 28$^a$ attached thereto, whereupon sand falls from the hopper into the funnel 25 and passes through the beam to the sand container or receptacle mounted below the flask position, as will hereinafter appear.

Bracket arms 29 are adjustably mounted one on each part 3 and 3$^a$ and extend toward each other, each having a roller or pulley rotatably mounted at its free inner end over which cords or cables 31 pass having counterweights 32 attached at one end and being attached at their other ends to stirrup members 33. Guard plates having sides 34 and one integral connected end 35 are carried by the stirrups, other plates 36 being disposed between arms 14 and 15 of the yokes described. In lower position the guard plates cover the meeting edges between the upper and lower sides of the flasks and flask carrying members and the lower side of beam 22 and upper side of the sand receptacle, stopping any outward blowing of the sand at such joints as might occur otherwise and guarding workmen thereagainst. The entire guard arrangement may be elevated out of the way when the flasks and their holders are turned about the post 2$^a$ and lowered when in proper position, the counterweights aiding in this operation. The rods 33$^a$ extending upwardly from the stirrups 33 may be used to serve as guides to prevent swaying of the guard plates and binding against parts of the apparatus with which they would come in contact.

Figure 4:
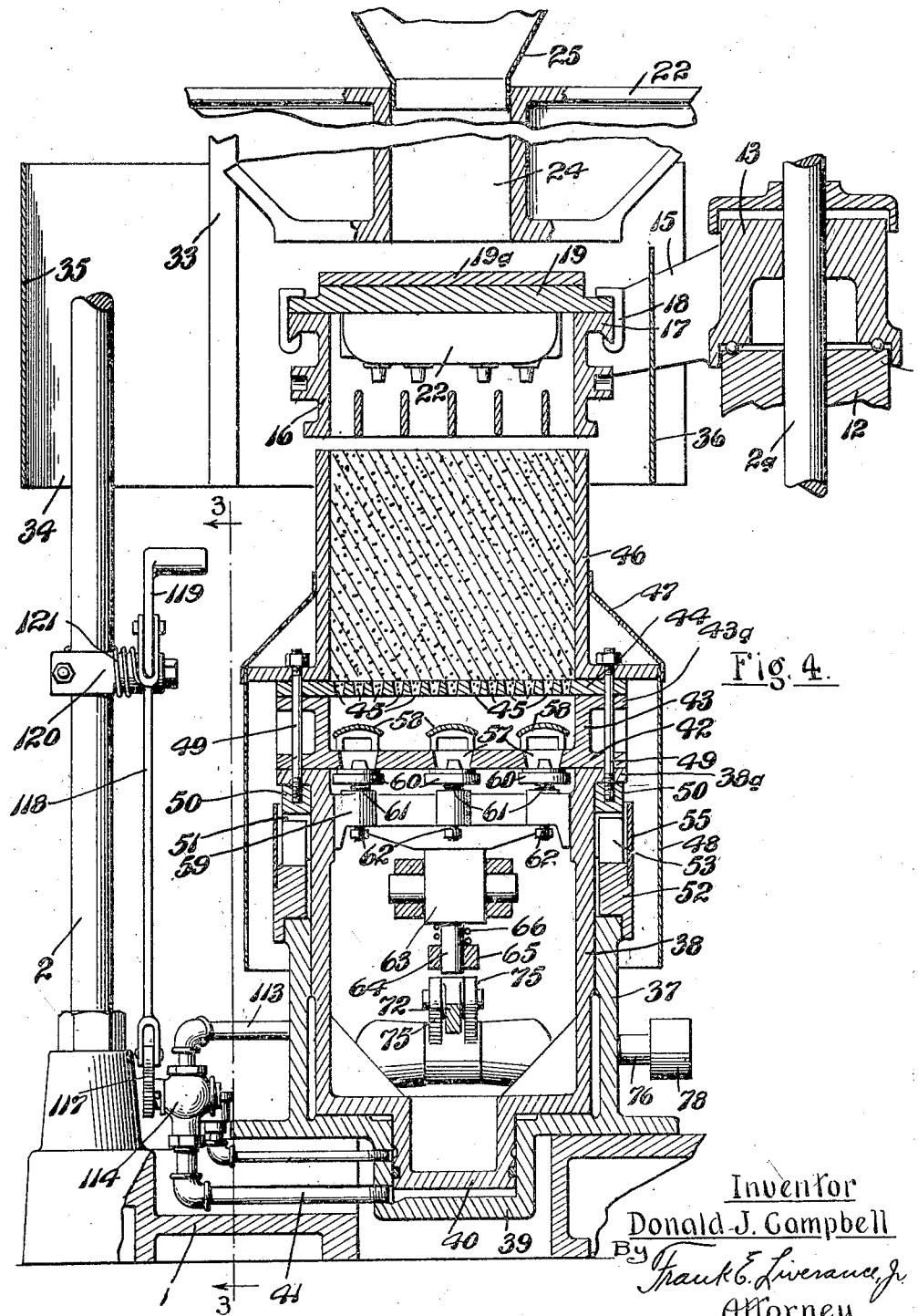
Fig. 4 is a vertical section taken substantially centrally through the machine and in a plane paralleling the front of the same.

On the base 1 between the side posts, a cylinder 37 open at its upper end is fixed within which a second cylinder 38 is mounted, extending a considerable distance above the upper end of the cylinder 37. The cylinder 38 is hollow and is utilized as a reservoir to hold a relatively large quantity of compressed air. The cylinder 37, at its bottom is provided with an integrally formed downwardly extended smaller cylinder or well 39 into which a like cylinder 40 on the cyinder 38 extends, there being suitable packing around the part 40 to preclude the passage of compressed air upwardly around it when it is entered into the lower end of the well 39 through feed pipe 41, as shown in Fig. 4.

The upper end of the air carrying cylinder 38 is covered by a valve plate 42. Integral upwardly extending sides 43 are formed with said plate, terminating at their upper edges in outwardly turned flanges 43$^a$ on which a plate 44 rests, in which a plurality of relatively small openings 45 are made, smaller at their lower than at their upper ends. A sand holding member or hopper 46 lies over the plate 44, said plate serving as a perforated bottom to the sand hopper. The member 46 has relatively wide flanges extending outwardly at its lower end and inclined guard plates 47 of sheet metal are attached to the sides of the hopper, extending downwardly and outwardly to the edges of said flanges, from which a cylindrical guard 48 of sheet metal depends to a point below the upper edge of the outer cylinder 37 of the apparatus.

Figure 8:
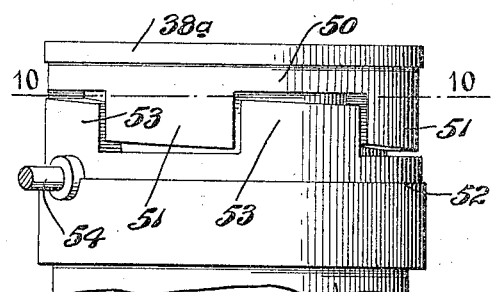
Figs. 8 and 9 are fragmentary side elevations showing, in two positions, the positive locking means used for holding the flask in clamped position after it has been clamped through pneumatically operated means.
Figure 9:
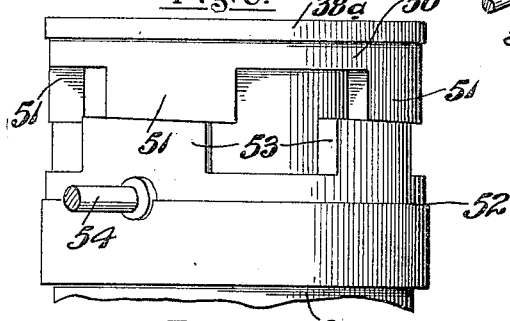
Figure 10:
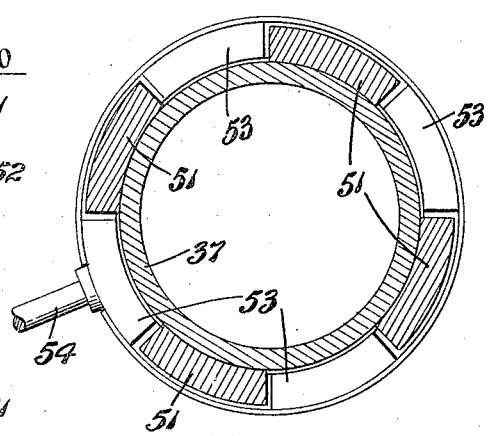
Fig. 10 is a horizontal section on line 10—10, of Fig. 8.
Figure 11:
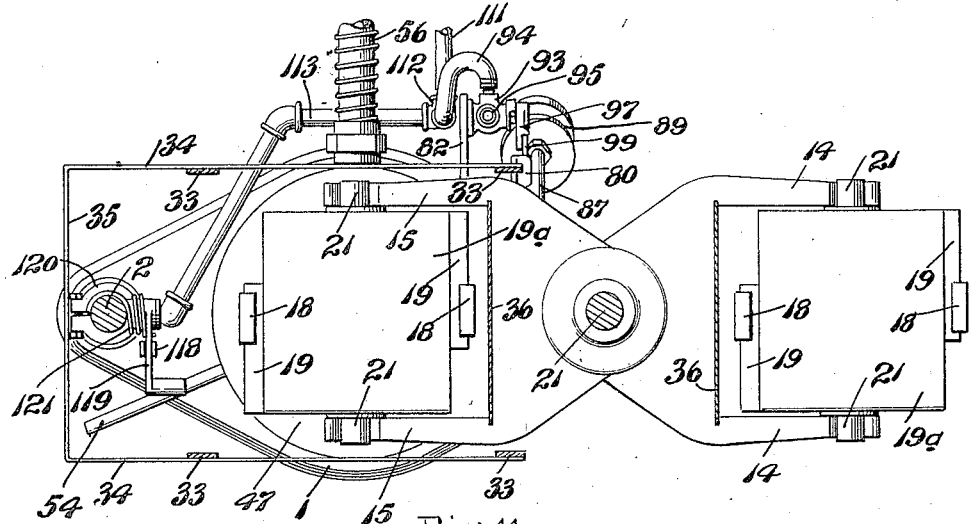
Fig. 11 is a horizontal section on line 11—11, of Fig. 1.
Figure 12:
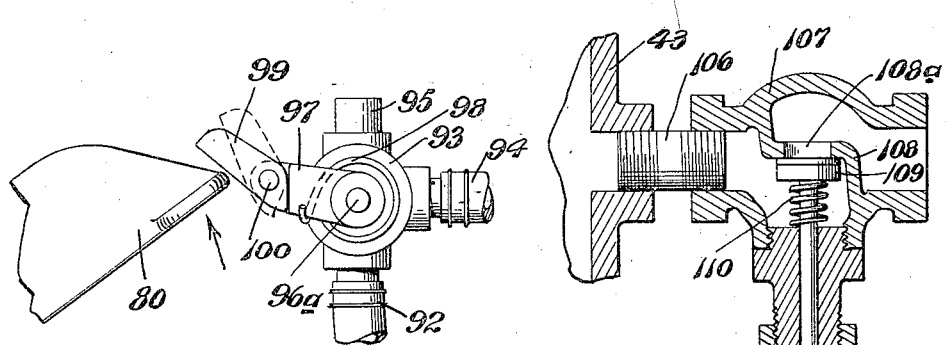
Fig. 12 is a fragmentary enlarged side elevation of the air valve mechanism for operating the release of the valves in the air reservoir or chamber.

The inner cylinder 38 is formed at its upper end with outwardly extending flanges 38$^a$ under which a ring 50 is located. Bolts 49 pass through the flanges of the hopper 46, the flanges 43$^a$, valve plate 42, flanges 38$^a$ and thread into the ring 50 whereby all of the parts described are securely connected together. From the ring 50, at spaced apart intervals, wide lugs 51 extend downwardly, the lower edges of which are slightly inclined to the horizontal. A second ring 52 rests on the upper edges of the outer cylinder 37 and it is provided with upwardly extended lugs 53, the upper edges of which are similarly formed. Normally the lugs 51 and 53 pass by each other in the lower position of the inner cylinder 38 in the outer cylinder 37 but when in upper position, or after the inner cylinder has been elevated by entering the air through pipe 41 into the well 39, the lower ring may be turned by handle 54 attached thereto and extending outwardly through a slot in guard 48 to the position shown in Fig. 9, thereupon the lugs serve as a lock against downward movement of the inner cylinder until moved back to the position shown in Fig. 8. The inclined edges of the lugs passing by each other wedge the inner cylinder upwardly, thereby bring the upper edges of the sand hopper 46 tightly against the under edges of flask 16, and the plate or bottom 19$^a$ tightly against the under side of the beam 22, as is evident. A band 55 of sheet metal is attached to the ring 52 and extends upwardly to cover the lugs and exclude sand which might possibly get between them.

Compressed air is supplied to the reservoir within the cylinder 38 through a connection 56 which may be connected with any suitable main supply tank, this connection passing through a vertical slot 56$^a$ in the side of the cylinder 37. The valve plate 42 has a plurality of openings 57 therethrough for passage of air from the reservoir to under the perforated plate 44, and each opening is preferably guarded against sand entrance therein by an overhead cover 58 with side openings for air passage. A valve carrying member or spider 59 is mounted for vertical sliding movements in the upper end of the air reservoir cylinder 38, carrying a plurality of valves 60 to close the openings 57 at their under sides, springs 61 of relatively light strength being disposed between the valves and the spider and around stems or rods 62 connected to the valves and passing downwardly the spider and having limited vertical movements therein.

A post 63 extends downwardly from the center of the spider 59, terminating in a short rod 64 which passes freely through a horizontal portion of a bracket 65 disposed across and between the inner sides of the reservoir cylinder 38. A spring 66 lies around the rod 64 between the bracket and lower end of the post 63. Two levers 67, paralleling each other and located one at each side of post 63 are pivotally connected at 68 to the bracket 65 at one end and at 69 between their ends to the post 63. A link 70 is pivotally connected at its upper end to the opposite ends of the levers 67, extending downwardly therefrom to and having pivotal connection at the knuckle 71 of a toggle lever arrangement consisting of lever members 72 and 73, the latter of which are pivotally connected at 74 to bracket 65 while the former has pivotal connection to arms 75 fixed to and projecting from a shaft 76 which extends outwardly through a vertical slot 77 in the outer cylinder 37.

Figure 6:
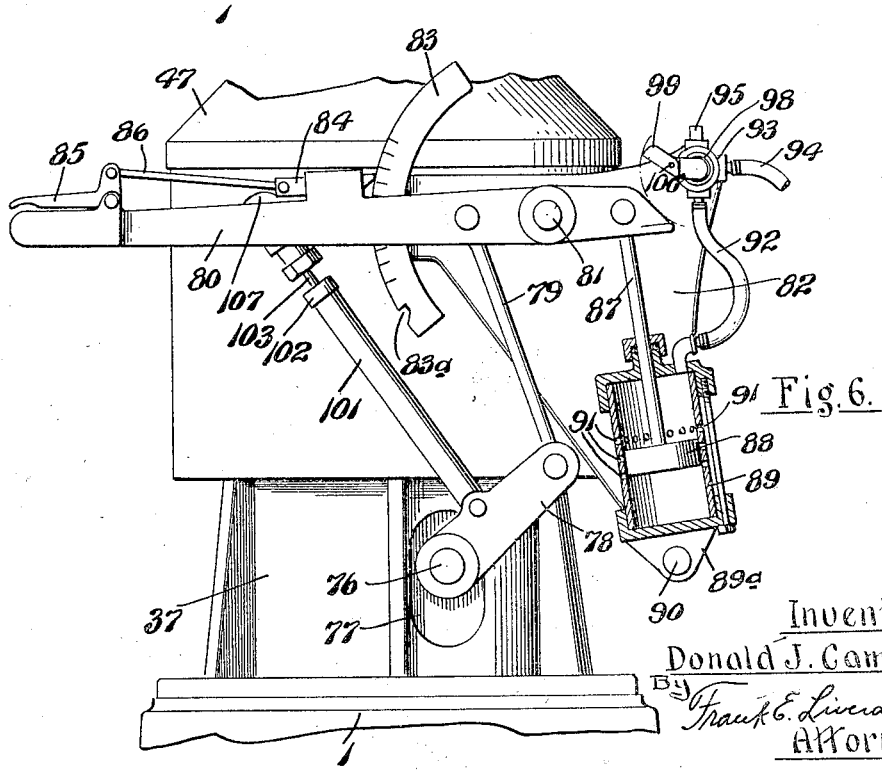
Figure 7:
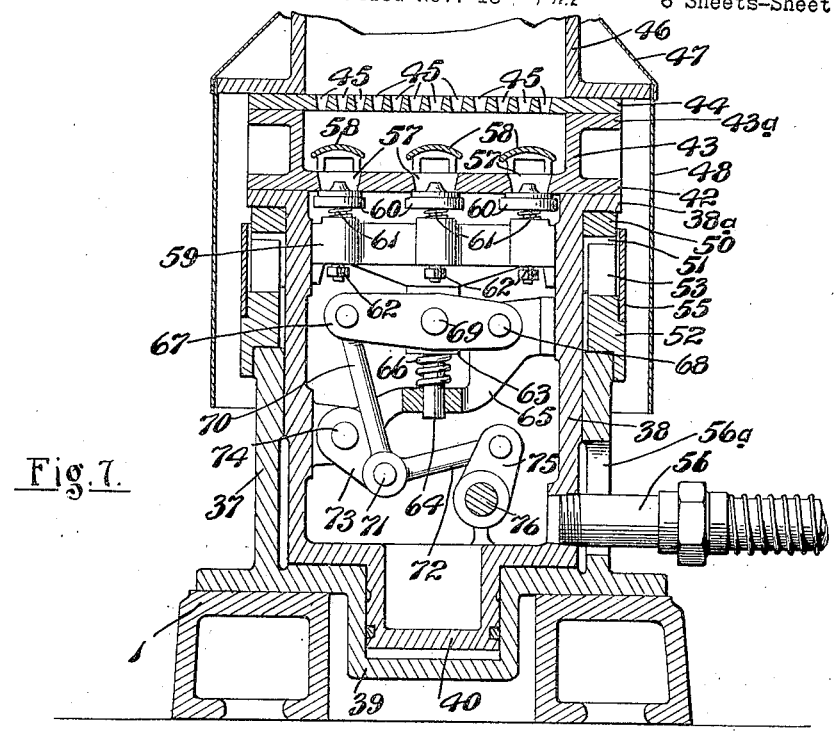
Fig. 7 is a vertical section through said lower portion of the apparatus and in a plane at right angles to that shown in Fig. 4.

At the outer end of the shaft 76, an arm 78 is secured. A link 79 is pivotally connected to the end of the arm and extends upwardly to and connects with a handle lever 80 pivotally connected at 81 between its ends to a bracket support 82. A sector 83 is connected with the bracket 82 and has a notch 83$^a$ therein (see Fig. 6) for the reception of the end of a dog 84 which is mounted on the handle lever 80, adapted to be manually disengaged by operation of a lever 85 which is connected with the dog by a link 86 in a well known manner. Link 79 is connected to the hand lever 80 at one side of the pivot 81, and at the opposite side of the pivot near the free end of the lever a piston rod 87 is pivotally connected, at the lower end of which a piston 88 is secured. The piston is located in a cylinder 89, the bottom of which has ears 89$^a$ extending therefrom having pivotal connection at 90 to the bracket 82. At a distance below the upper end of the cylinder several series of spaced apart openings 91 are made through its walls so that when the piston passes below the same, the air is exhausted out through said openings. Air is supplied to the upper end of the cylinder 89 through an inlet hose 92.

Figure 13:
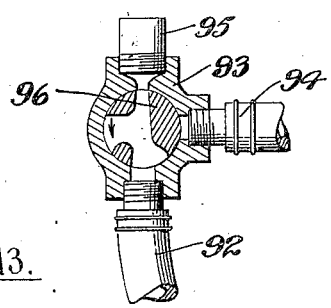
Fig. 13 is a cross section through said valve.

The hose 92 is connected to a valve casing 93 which has an air inlet connection 94 and an exhaust outlet 95. A three-way valve 96 is rotatably mounted in the casing for control of the inlet into or exhaust of the air from the cylinder 89. An arm 97 is connected to the valve 96 and a spring 98 is connected with the casing 93 and said arm, the tendency of which is to move the valve to its exhaust position as shown in Fig. 13. A member 99 is pivotally connected at 100 to the outer end of arm 97 and lies in the path of movement of the handle lever 80. When the handle lever is disengaged so as to move upwardly, the first effect is to turn part 99 and arm 97 in a downward direction, turning the valve and bringing the valve passages in such position that air passes through the valve from inlet 94 to the cylinder 89, whereupon the piston 88 moved downwardly to the position shown in Fig. 6 with a resultant turning of lever 80 and turning of the shaft 76 connected therewith. The turning of the shaft 76 operates the toggle lever and link mechanism in the reservoir cylinder and draws the spider 59 and valves connected therewith downwardly, opening the openings 57 for air passage to below the perforated plate 44 under the sand in the sand hopper 46. It will be noted that this air passage is momentary only, as the end of the lever 80 passes by the end of member 99 almost immediately, whereupon the valve arm 97 is released for return to exhaust position under the influence of spring 98, the air exhausting from the cylinder 89 and the air in reservoir 38 helping to move the valves 60 to closing position.

Figure 14:
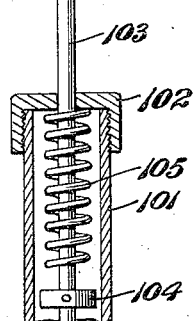
Fig. 14 is an enlarged fragmentary vertical section of a valve mechanism used for exhausting the air from below the sand receptacle after a flask has been filled.

Between the link 79 and the shaft 76, a tube 101 has pivotal connection at its lower end to the arm 78. A cap 102 closes the upper end of the tube, through which cap a rod 103 has free passage, being provided with a collar 104 adjacent its lower end. A spring 105 is disposed around the rod between the cap and collar as shown in Fig. 14.

Figure 5:
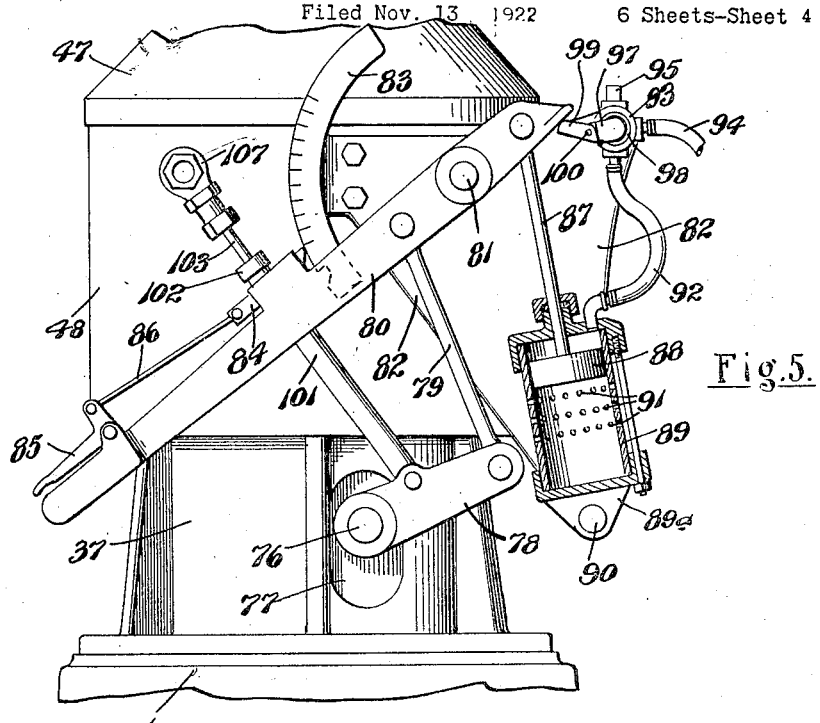
Figs. 5 and 6 are enlarged side elevations, with parts in section of the lower part of the apparatus illustrating, in two positions, the manually operable mechanism for controlling the air valve movements.

In one side 43, an exhaust opening is made in which a nipple 106 is secured to which a valve casing 107 is attached, having a cross web 108 with an opening 108$^a$ therethrough between the end connected to the nipple and the outlet. A valve 109 secured at the upper end of the rod 103 normally closes the opening in the web, a spring 110 serving to hold the valve in closed position in addition to the air pressure which is present at times. When the arm 78 is turned from the position shown in Fig. 5 to that shown in Fig. 6, the valve 109 is closed, or during the time that the air is passing by the valves 60 to act on the sand in the hopper 46. With the return of the arm to the position shown in Fig. 5, valve 109 is drawn to an open position, releasing the air below the same and above the valve plate 44.

Figure 3:
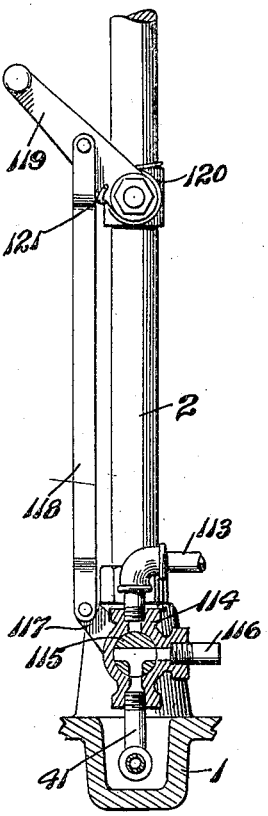
Fig. 3 is a vertical section and elevation, the section being on line 3—3, of Fig. 4.

The air for operating the piston 88 comes through a conduit 111 from any main supply tank, connecting with a coupling 112 with which the inlet pipe or hose 94 leading to the valve casing 93 is connected. A branch 113 leads from the coupling 112 to a valve casing 114, with which the pipe 41 connects as an outlet for the air and to carry it to the well 39 as previously described. A three way valve 115 is rotatably mounted in the casing 114, in one position carrying air from pipe 113 to the pipe 41, and in the other, shown in Fig. 3, carrying the air back through pipe 41 to the exhaust outlet 116 to lower the air reservoir cylinder 38.

An arm 117 is connected to the valve 115, a link 118 being connected to the end of the arm and extending vertically alongside the post 2, being pivotally connected at its upper end to and between the ends of a handle lever 119 which is pivotally mounted at its inner end on a support 120 fixed on the post 2. A spring 121 is connected to the support 120 and acts normally to elevate the lever 119 to the position shown in Fig. 3, with the valve 115 in exhaust position.

In the operation of the apparatus described, the flasks 16 on the flask holders are brought into position between the beam 22 and the sand container or hopper 46. It will be noted that the yoke arms 14 and 15 are oppositely inclined to the horizontal so that the flasks carried are in the same horizontal plane. During the time that the flasks are not between the beam and hopper, sand is dropped from the overhead hopper 26 into funnel 25 and through the passage 24, falling into the hopper 46. This sand in hopper 46 is levelled, any excess falling on the inclined guard plate 47 and being carried outwardly away from the mechanism.

After the hopper 46 is filled with sand, a flask holder or carrier with a flask attached and in inverted position is brought between the hopper and the overhead beam 22, as shown in Fig. 4. The lever 119 is then pulled down, air passing through pipe 41 to the well 39 with a consequent elevation of the inner air reservoir cylinder and the hopper 46 carried thereby, the upper edges of the hopper coming against the under edges of the flask, elevating the flask and its attached carrier until the bottom 19$^a$ comes against the beam 22 which serves as a backing or abutment. The rod 54 is then operated to turn the ring 52 to locking position shown in Fig. 9, whereupon the lever 119 may be released with an exhaust of the air from the well 39 but with the parts elevated held in upper position by the abutting of lugs 51 and 53.

The next step in the operation is to operate handle lever 80 about its pivot 81 to open the valve 96 for passage of air to the cylinder 89 with a consequent movement of the valves 60 to open position and closing of the exhaust valve 109. The air thereupon rushes from the reservoir cylinder 38 and against the underside of the body of sand in hopper 46 forcing it upwardly and into the flask around the pattern, packing and compressing the sand in the flask. It will be noted that this action of the air occupies but a short interval of time for, as soon as the end of lever 80 passes by the member 99, the valve 96 is automatically moved from open to exhaust position and the valve operating mechanism is permitted to return to original position with a closing of the valves 60 and opening of the exhaust valve 109.

The flask being filled with sand, is released by turning rod 54 to unlock the lugs 51 and 53, the air cylinder 38 and attached parts lowering to initial position. The filled flask is moved out of the way, permitting the dropping of another charge of sand into the hopper 46, after which the other empty flask is moved to place and the operation repeated. Of course, the guard plates 34 and 35 are raised and lowered at the proper times to serve their functions. The filled flask is turned to position over the levelling table 9, the table brought against the under side of the flask and mould therein, clamps 18 removed, and the flask and mould taken from the table, after which the flask carrier may be turned over, another flask attached, and then inverted for readiness for moving to filling position.

With this construction of molding apparatus, the apparatus is simplified in many respects. The sand supply hopper is stationary and does not have to be moved. The only moving parts among the main elements of the apparatus which have to be moved out of the way are the flask carriers, and these are simply mounted and by reason of the use of two thereof, the speed of production is enhanced, one flask being filled while the other is being removed and replaced by an empty. The mechanism for controlling the air is simple and durable and not liable to get out of order. In every way the apparatus is practical for large quantity production of moulds. The claims appended define the invention and it is to be considered as comprehensive of all forms of structure coming within the scope of said claims.

I claim:

1. In an apparatus of the class described, a base, posts extending therefrom, a beam having a vertical opening therethrough located between the upper portions of the posts, a stationary sand supply hopper mounted over the beam directly above said opening, a flask carying member rotatably mounted on one of the posts to swing to position below the beam, and adapted to carry a flask in inverted position, a sand receiving hopper located below the plane of movement of the flask carrying member and flask thereon, and means for projecting sand from said sand receiving hopper upwardly into the flask by action of compressed air, substantially as described.

2. In an apparatus of the class described, a support, a beam horizontally mounted on the support having a vertical opening therethrough, a sand supply hopper mounted above the beam over said opening, a sand receiving hopper located a distance below the beam to receive sand dropped from the supply hopper through said opening, a movably mounted flask carrier adapted to have flasks detachably connected thereto and movable into and out of position between the beam and the sand receiving hopper, means for elevating the sand receiving hopper to clamp the flask and its carrying member between said hopper and the beam, and pneumatic means for projecting sand from the sand receiving hopper into the flask, substantially as described.

3. In an apparatus of the class described, a base, two posts extending therefrom, a beam having a vertical opening therethrough located between the upper portions of the posts, a flask carrying member mounted to turn horizontally about one of the posts and adapted to carry a flask in inverted position on its under side, a cylinder extending upwardly from the base, an inner cylinder mounted in the first cylinder and extending above the same, said inner cylinder being hollow, means for continuously supplying the inner cylinder with compressed air, valve mechanism within the inner cylinder for preventing escape of air, a plate having a plurality of openings therethrough located above and connected with said inner cylinder, a hopper for receiving sand attached to and lying above said plate, the flask being adapted to be brought directly over said hopper and under the beam, pneumatic means for elevating the inner cylinder, and means for opening the valve mechanism for escape of compressed air from said inner cylinder to project the sand out of the hopper into the flask above it, substantially as described.

4. A construction containing the elements in combination defined in claim 3, combined with means for positively locking the inner cylinder in upper position after being elevated, substantially as described.

5. A construction of the class described containing the elements in combination defined in claim 3, combined with a ring located around the inner cylinder and bearing against the upper edges of the outer cylinder, spaced apart lugs projecting upwardly therefrom, manually operable means for turning the ring around said inner cylinder, a second ring permanently secured in fixed relation to the inner cylinder and located above the first ring, and spaced apart lugs extending downwardly therefrom.

6. In an apparatus of the class described, a base, a cylinder open at its upper end connected to and extending upwardly from the base, a second cylinder mounted in the first cylinder and extending upwardly therefrom, a plate having openings therein located across the upper end of the cylinder, vertical sides extending from the plate, a second plate having a large number of openings therethrough positioned across the upper edges of said vertical sides, a sand hopper having vertical sides and an open upper end located over the second plate, means for entering air into the first cylinder below the inner cylinder to elevate said inner cylinder, means for normally closing the first plate openings, means for supplying the inner cylinder with compressed air, means for momentarily moving the said closing means to an open position to allow escape of air, and an inverted flask located over the upper end of the sand hopper to receive sand projected from the hopper by action of the compressed air.

7. In an apparatus of the class described, a base, a cylinder mounted on and extending vertically therefrom, a valve plate provided with openings therethrough secured across the upper end of the cylinder, valves for closing said openings, means for carrying compressed air to the interior of the cylinder, vertical sides extending from the valve plate, a second plate having a large number of small openings therethrough secured over the valve plate at the upper edges of said sides, a sand hopper having vertical sides and an open upper end secured above the second plate, a flask mounted to be moved over the upper end of the hopper and in an inverted position to receive sand from the hopper, and means for momentarily moving the valves to open position to permit escape of air from the cylinder, substantially as described.

8. A construction containing the elements in combination defined in claim 7 combined with means for elevating the cylinder to bring the upper edges of the sand hopper tightly against the lower edges of the flask, and a backing member against which the flask and its carrier are pressed on said elevation of the cylinder.

9. In combination, a vertically positioned cylinder, a valve plate having openings therein secured at the upper end of the cylinder, valves for closing the openings, means for supplying the cylinder with compressed air, a spider carrying all of the valves, a shaft, connections between the shaft and spider for moving the spider downwardly on rotation of the shaft in one direction, and means for rotating the shaft in said direction, substantially as described.

10. In combination, a vertically positioned cylinder, a valve plate having openings therein secured at the upper end of the cylinder, valves for closing the openings, a spider carrying all of the valves, a shaft, connections between the shaft and spider for moving the spider downwardly on rotation of the shaft in one direction, a handle lever on the shaft, said lever being adapted for initial manual operation, and means for operating the handle in the same direction to rotate the shaft by means of compressed air immediately after initial manual movement of the lever has started.

11. In combination, a vertically positioned cylinder, a valve plate having openings therethrough secured at the upper end of the cylinder, a spider movably mounted in the cylinder, valves to close said openings carried by the spider, a shaft mounted in the cylinder and extending outwardly therefrom at one end, connections between the spider and shaft for moving the spider downwardly on rotation of the shaft in one direction, a hand lever attached to the shaft, a piston rod attached to the lever, a piston on the rod, a cylinder in which the piston is located, means for carrying compressed air to said last named cylinder, a normally inoperative valve for controlling the air passage to the cylinder, means to turn the valve on initial manual operation of the hand lever to pass air to the cylinder to aid in further movement of the lever, and an air pipe carrying compressed air to the first cylinder, substantially as described.

12. In an apparatus of the class described, a vertically positioned cylinder, a valve plate having openings therethrough secured at the upper end of the cylinder, vertical sides extending from the valve plate, a second plate having a large number of relatively small openings located and secured across the upper edges of said sides, a sand hopper having vertical sides and an open upper end secured above the second plate, valves for normally closing the openings in the valve plate, means for momentarily moving said valves to open position to allow passage of air in the cylinder therethrough, means to supply the cylinder with compressed air, an exhaust outlet in one of the vertical sides extending from the valve plate having a valve therein, means for normally holding said valve open, said means being connected to the operating means for the first named valves to permit closure of the exhaust valve on opening of the first valves and vice versa, substantially as described.

13. In a construction of the class described, an air containing cylinder provided at its lower end with a downwardly extending cylindrical projection, an outer cylinder in which the first cylinder is mounted and formed with a cylindrical well at its lower end into which said projection extends, an air pipe connected with the lower end of the well, valve mechanism connected with the pipe including a valve casing and a rotary valve therein, compressed air inlet means to the casing, an exhaust outlet to the casing, manually operable means for turning the valve to provide free passage of compressed air to the well, and yielding means normally turning the valve to position for connecting the well with the exhaust outlet of the casing, substantially as described.

In testimony whereof I affix my signature.

DONALD J. CAMPBELL.